United States Patent
Haft et al.

(10) Patent No.: US 8,224,553 B2
(45) Date of Patent: Jul. 17, 2012

(54) METHOD AND DEVICE FOR OPERATING AN INTERNAL COMBUSTION ENGINE

(75) Inventors: Gerhard Haft, Obermotzing (DE); Markus Mantei, Friedersdorf (DE); Jens Thude, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 651 days.

(21) Appl. No.: 12/279,301

(22) PCT Filed: Jan. 31, 2007

(86) PCT No.: PCT/EP2007/050937
§ 371 (c)(1),
(2), (4) Date: Nov. 12, 2008

(87) PCT Pub. No.: WO2007/093501
PCT Pub. Date: Aug. 23, 2007

(65) Prior Publication Data
US 2009/0164088 A1    Jun. 25, 2009

(30) Foreign Application Priority Data
Feb. 17, 2006 (DE) .......................... 10 2006 007 417

(51) Int. Cl.
*G06F 19/00* (2011.01)
*G06G 7/70* (2006.01)
(52) U.S. Cl. .......................... 701/102; 60/277
(58) Field of Classification Search .................. 701/102; 60/277, 285, 286, 299, 284
See application file for complete search history.

(56) References Cited

U.S. PATENT DOCUMENTS

| | | | |
|---|---|---|---|
| 5,647,669 A | 7/1997 | Schnaibel et al. | 374/144 |
| 5,746,049 A * | 5/1998 | Cullen et al. | 60/274 |
| 6,898,928 B2 * | 5/2005 | Wagner et al. | 60/285 |
| 6,957,527 B2 | 10/2005 | Ueda et al. | 60/274 |
| 7,356,988 B2 * | 4/2008 | Pott et al. | 60/285 |
| 7,726,117 B2 * | 6/2010 | Haft | 60/285 |
| 2004/0050036 A1 * | 3/2004 | Ueda et al. | 60/285 |
| 2007/0186541 A1 * | 8/2007 | Haft | 60/285 |

FOREIGN PATENT DOCUMENTS

| | | |
|---|---|---|
| DE | 44 24 811 A1 | 1/1996 |
| DE | 198 36 955 A1 | 3/2000 |
| DE | 199 28 561 A1 | 1/2001 |
| DE | 102 01 465 A1 | 8/2003 |
| DE | 102 03 920 A1 | 9/2003 |
| DE | 10 2004 009 646 A1 | 9/2004 |
| DE | 10 2004 033 394 B3 | 12/2005 |
| EP | 1 515 017 A2 | 9/2004 |
| EP | 1515017 A2 * | 3/2005 |
| WO | WO 2004/013474 A1 | 2/2004 |

* cited by examiner

*Primary Examiner* — Stephen K Cronin
*Assistant Examiner* — Sizo Vilakazi
(74) *Attorney, Agent, or Firm* — King & Spalding L.L.P.

(57) ABSTRACT

An internal combustion engine has at least one cylinder and an exhaust gas tract, which contains a component to be protected. An estimated dynamic component temperature of the component is determined in accordance with at least one operating variable of the internal combustion engine, taking into consideration the dynamic behavior of the section of the internal combustion engine. An estimated stationary component temperature of the component is determined in accordance with at least one operating variable of the internal combustion engine without taking into consideration the dynamic behavior of the section of the internal combustion engine. An actual value is determined for the component temperature of the component in accordance with the estimated dynamic and stationary component temperatures of the component to be protected. Protective measures for the component are implemented in accordance with the actual value of the component temperature of the component to be protected.

6 Claims, 2 Drawing Sheets

METHOD AND DEVICE FOR OPERATING AN INTERNAL COMBUSTION ENGINE

CROSS-REFERENCE TO RELATED APPLICATIONS

This application is a U.S. national stage application of International Application No. PCT/EP2007/050937 filed Jan. 31, 2007, which designates the United States of America, and claims priority to German application number 10 2006 007 417.3 filed Feb. 17, 2006, the contents of which are hereby incorporated by reference in their entirety.

TECHNICAL FIELD

The invention relates to a method and a device for operating an internal combustion engine comprising at least one cylinder, in particular a plurality of cylinders, and an exhaust gas tract that contains a component to be protected. The component to be protected can be a catalytic converter, for example, which is contained in the exhaust gas tract.

BACKGROUND

Increasingly strict legal provisions relating to permitted pollutant emissions from motor vehicles containing internal combustion engines make it necessary to keep pollutant emissions as low as possible, at least within set operating areas of the internal combustion engine. This can be achieved firstly by reducing pollutant emissions generated during combustion of the air-fuel mixture in the respective cylinder of the internal combustion engine. Secondly, exhaust gas treatment systems are used in internal combustion engines to convert into harmless substances the pollutant emissions generated during the process of combustion of the air-gas mixture in the respective cylinders. Catalytic converters, which can convert carbon monoxide, hydrocarbons and nitrous oxides into harmless substances, are used for this purpose.

The prerequisite for a good long-term conversion capacity of catalytic converters is that the catalytic converters do not overheat. For this reason it is necessary for measures to be implemented where necessary to prevent the catalytic converter from overheating, particularly in operating areas of the internal combustion engine in which a very high output is expected to be generated by the internal combustion engine.

DE 10 2004 033 394 B3 discloses an engine control that sets an exhaust-gas temperature by influencing the air-fuel mixture and includes a temperature model which calculates the temperature for a component to be protected in the exhaust gas tract. The temperature model determines a predicted temperature for the component contained in the exhaust gas tract, said temperature becoming established after a fairly long time while maintaining current operating and driving conditions. The predicted temperature is the component temperature for the component to be protected that becomes established in continuous operation. In order for the component to be protected, the engine control system regulates the exhaust-gas as a function of the predicted temperature.

SUMMARY

A simple and/or reliable method and device for operating an internal combustion engine can be created.

According to an embodiment, a method for operating an internal combustion engine having at least one cylinder and an exhaust gas tract, which includes a component to be protected, may comprise the steps of: —determining an estimated dynamic component temperature of the component to be protected as a function of at least one operating variable of the internal combustion engine, taking into consideration the dynamic behavior of the section of the internal combustion engine, —determining an estimated stationery component temperature of the component to be protected as a function of at least one operating variable of the internal combustion engine, without taking into consideration the dynamic behavior of the section of the internal combustion engine, —determining an actual value for the component temperature of the component to be protected as a function of the estimated dynamic and stationary component temperature of the component to be protected and—implementing protective measures for the component to be protected as a function of the actual value for the component temperature of the component to be protected.

According to a further embodiment, a stationarity coefficient can be determined as a function of at least one operating variable of the internal combustion engine and, as a function of said stationarity coefficient, and a method of assigning the estimated dynamic and stationary component temperature of the component to be protected to the actual value for the component temperature can be influenced. According to a further embodiment, the stationarity coefficient may be a gradient of the estimated dynamic component temperature of the component to be protected. According to a further embodiment, the stationarity coefficient may be a difference between the estimated dynamic and stationary component temperature of the component to be protected. According to a further embodiment, the stationarity coefficient may be a gradient of a difference between the estimated dynamic and stationary component temperature of the component to be protected.

According to another embodiment, a device for operating an internal combustion engine may comprise at least one cylinder and an exhaust gas tract which contains a component to be protected, said device may be operable—to determine an estimated dynamic component temperature of the component to be protected as a function of at least one operating variable of the internal combustion engine, taking into consideration the dynamic behavior of the section of the internal combustion engine, —to determine an estimated stationary component temperature of the component to be protected as a function of the at least one operating variable of the internal combustion engine, without taking into consideration the dynamic behavior of the section of the internal combustion engine, —to determine an actual value for the component temperature of the component to be protected as a function of the estimated dynamic and stationary component temperature of the component to be protected and—to implement protective measures for the component to be protected as a function of the actual value for the component temperature of the component to be protected.

BRIEF DESCRIPTION OF THE DRAWINGS

Embodiments of the invention are shown hereafter by means of the schematic drawings.

The drawings show.

Figure 1:
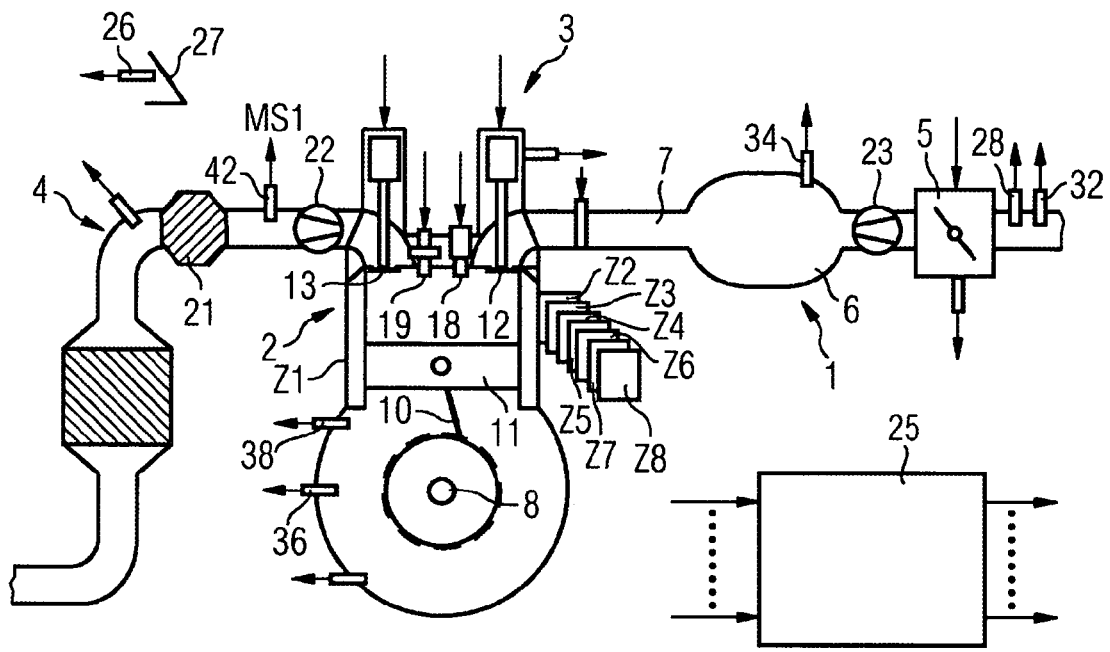
FIG. 1: an internal combustion engine.

Elements with an identical design or function are denoted by the same reference signs on both figures.

DETAILED DESCRIPTION

According to various embodiments, a method and a corresponding device for operating an internal combustion engine may comprise at least one cylinder and an exhaust gas tract which contains a component to be protected. Generally, an internal combustion engine also includes a plurality of cylinders. The component to be protected is preferably a catalytic converter in the exhaust gas tract, but it is also possible, however, for it to be any other component of the exhaust gas tract, such as, for example a turbine of an exhaust gas turbocharger. An estimated dynamic component temperature of the component to be protected is determined as a function of at least one operating variable of the internal combustion engine taking into consideration the dynamic properties of the section of the internal combustion engine. An operating variable should be understood as measurable variables and also values derived therefrom pertaining to the internal combustion engine.

An estimated stationary component temperature of the component to be protected is determined as a function of the at least one operating variable of the internal combustion engine without taking into consideration the dynamic behavior of the section of the internal combustion engine.

The section denotes that part of the internal combustion engine that is relevant for the determination of the estimated dynamic or stationary component temperature in relation to the at least one operating variable.

For the purpose of the determination of the estimated dynamic or stationary component temperature, a corresponding physical model, which can also be referred to as an observer, may be preferably provided. The estimated dynamic component temperature is thus representative of an actual current component temperature of the component to be protected, whilst the estimated stationary component temperature represents the component temperature that will become established under stationary conditions in relation to the value of at least one operating variable that is used to determine the estimated stationary component temperature.

An actual value for the component temperature of the component to be protected is determined as a function of the estimated dynamic and stationary component temperatures of the component to be protected. Protective measures for the component to be protected are implemented as a function of the actual value of the component temperature of the component to be protected.

By determining the actual value of the component temperature of the component to be protected as a function of the estimated dynamic and stationary component temperature of the component to be protected, a value range between the dynamic and stationary component temperature can be assigned to the actual value depending on the respective current operating mode and thus a particularly suitable evaluation of the protective measure to be carried out can be achieved for the respective operating mode as a function of the actual value.

According to an embodiment, a stationarity coefficient is determined as a function of at least one operating variable of the internal combustion engine and, as a function of the stationarity coefficient, it is possible to influence a method by which the estimated dynamic or stationary component temperature of the component to be protected is assigned to the actual value of the component temperature.

In this way, use is made of the knowledge that a degree of stationarity of the current operation of the internal combustion engine determines to what degree the dynamic or stationary component temperature of the component to be protected should be assigned to the actual value of the component temperature of the component to be protected in terms of an efficient as possible implementation of the protective measures. It has become evident in particular that in a virtually stationary operating state following a nonstationary operating state, the actual component temperature of the component to be protected slowly approaches the estimated stationary component temperature. To this extent it is an advantage precisely in such a virtually stationary operating state in order to avoid an unnecessarily pronounced protective measure if the estimated dynamic component temperature of the component to be protected is used as a yardstick to determine the actual value.

According to a further embodiment, the stationarity coefficient is a gradient of the estimated dynamic component temperature of the component to be protected. In this way, the stationarity coefficient can be calculated in a particularly simple manner and with sufficient precision from values that have already been determined.

According to a further embodiment, the stationarity coefficient is a difference between the estimated dynamic and stationary component temperature of the component to be protected. In this way, the stationarity coefficient can also be calculated in a particularly simple manner and with sufficient precision from values that have already been determined.

According to a further embodiment, the stationarity coefficient is a gradient of a difference between the estimated dynamic and stationary component temperature of the component to be protected. In this way, the stationarity coefficient can be calculated in a particularly precise manner.

An internal combustion engine (FIG. 1) includes an intake tract 1, an engine block 2, a cylinder head 3 and an exhaust gas tract 4. The intake tract 1 preferably may include a throttle valve 5, and further includes a manifold 6 and an induction pipe 7, which leads to a cylinder Z1 via an inlet channel into the engine block 2. The engine block 2 further comprises a crankshaft 8, which is connected via a connecting rod 10 to the piston 11 of the cylinder Z1.

The cylinder head 3 includes a valve drive having a gas inlet valve 12 and gas outlet valve 13.

The cylinder head 3 further comprises an injection valve 18 and a spark plug 19. Alternatively, the injection valve 18 can also be arranged in the induction pipe 7. The injection valve 18 is part of an injection system that also comprises a fuel supplying device and a triggering device for the injection valve 18 and preferably also may comprise a fuel pump. The spark plug 19 is part of an ignition system that also comprises a triggering device for the spark plug 19.

In the exhaust gas tract 4, a catalytic converter 21 is arranged, said converter preferably may be configured as a three-way catalytic converter. Alternatively or additionally the catalytic converter 21 can be configured as a NOx-catalytic converter.

Furthermore, a turbine 22 of an exhaust gas turbocharger may be preferably arranged in the exhaust gas tract, said turbine 22 driving a compressor 23 in the intake tract 1. In addition to the above, there is also a secondary air injection device, which is not shown, by means of which fresh air can be fed into the exhaust gas tract 4.

The internal combustion engine comprises a plurality of cylinders Z1-Z8, which can be split up into a plurality of groups, each of which can optionally be assigned its own exhaust gas tract.

A control device 25 is provided, said device being assigned sensors that record various measurable variables and determine the value of each respective measurable variable. Operating variables include both the measurable variables and variables derived therefrom. The control device 25 determines manipulated variables as a function of at least one of the measurable variables, said manipulated variables then being converted into one or a plurality of actuating signals to control the actuating elements by means of corresponding actuating drives. The control device 25 can also be used as a device to control the internal combustion engine or as a device to operate the internal combustion engine.

The sensors are a pedal position sensor 26, which records a driving pedal position of a driving pedal 27, an air mass sensor 28, which records an mass air flow upstream of the throttle valve 5, a first temperature sensor 32, which records an intake air temperature TIA, a suction pressure sensor 34, which records a suction pressure in the manifold 6, a crank angle sensor 36, which records a crank angle to which a number of revs N is then assigned, and a second temperature sensor 38, which records a coolant temperature TCO.

Furthermore, an exhaust gas probe 42 is provided, said probe being arranged upstream of the catalytic converter 21 or in the catalytic converter 21 and determining a residual oxygen content of the exhaust gas and the measurement signal of which is characteristic of the air/fuel ratio in the combustion chamber of the assigned cylinder or cylinders Z1-Z8 and upstream of the exhaust gas probe 42 of the exhaust gas tract 4 before the fuel is oxidized.

Depending on the embodiment, any subset of the aforementioned sensors may be present or additional sensors may also be present. Thus, for example, a sensor for determining the vehicle speed VS can also be provided.

The actuating elements are, for example, the throttle valve 5, the gas inlet and gas outlet valves 12, 13, the injection valve 18, the spark plug 19 or the turbine 22.

The actuating elements and sensors are shown in FIG. 1 in particular in relation to the cylinder Z1. The further cylinders can also be preferably assigned corresponding actuating elements and optionally sensors. Preferably each cylinder may thus be assigned an injection valve 18 and a spark plug 19.

The control device 25 preferably may include a lambda regulator, which forms part of a lambda regulating unit.

Figure 2:
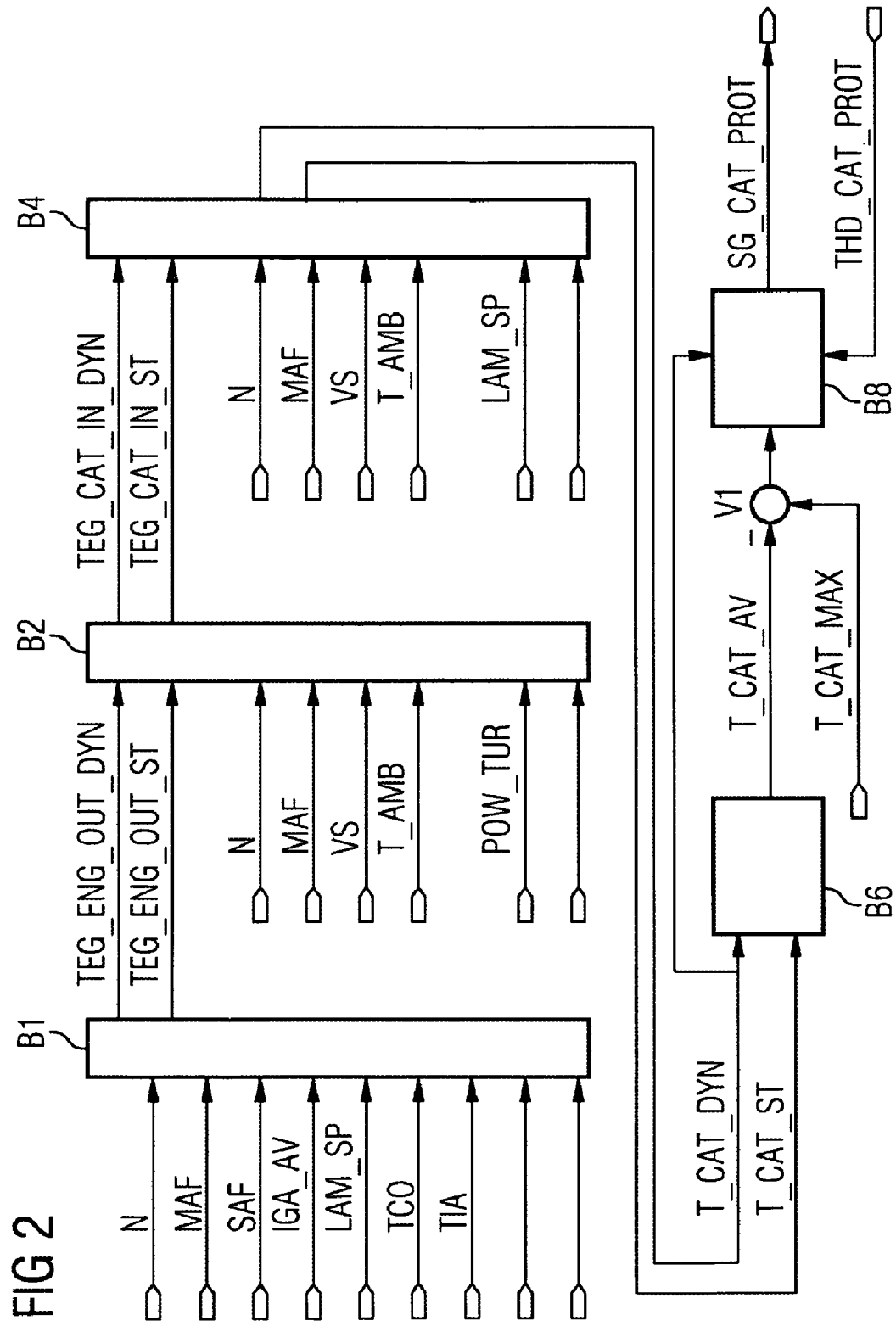
FIG. 2: a block diagram showing the operation of the internal combustion engine.

The block circuit diagram in FIG. 2 shows in greater detail the functionality of the control device 25 in terms of carrying out protective measures for a component to be protected of the exhaust gas tract. The component to be protected in the exhaust gas tract 4 may preferably be the catalytic converter 21. It can also be any other component of the exhaust gas tract, however, such as the turbine 22.

The functionality of the block circuit diagram in FIG. 2 may preferably be stored in the form of programs in the control device 25 and is run in the control device 25 during the operation of the internal combustion engine.

A block B1 includes a physical model of the internal combustion engine extending as far as the outlet of the combustion chamber of the respective cylinder Z1 to Z8 into the exhaust gas tract 4. The model can also be referred to as an observer. It is designed to determine an estimated dynamic exhaust gas temperature TEG_ENG_OUT_DYN during emission from the combustion chamber and an estimated stationary exhaust gas temperature TEG_ENG_OUT_ST during emission from the combustion chamber as function of the input variables thereof. The input variables are the number of revs N, the mass air flow MAF, a secondary mass air flow SAF, which can be supplied to the exhaust gas tract 4 via the secondary air injection device, an actual ignition angle IGA_AV, at which the ignition spark is actually generated in the respective spark plug 19, a reference air/fuel-ratio LAM_SP, which may preferably be set using a lambda regulator in the respective cylinders Z1 to Z8 of the internal combustion engine, the coolant temperature TCO and the intake air temperature TIA.

Input variables of the block B1 can also be a subset of or additional variables of the operating values set out above. Instead of the reference air/fuel-ratio LAM_SP, an actual air/fuel-ratio can be an input variable of the block B1, said ratio being derived from the measurement signal of the exhaust gas sensor 42. Instead of the actual ignition angle IGA_AV, it is also possible for a reference ignition angle to be an input variable of the block B1.

For the determination of the estimated dynamic exhaust gas temperature TEG_ENG_OUT_DYN during emission from the combustion chamber the model takes into account the dynamics of the section in relation to the input variables of the block B1. In this determination, consideration is taken in particular of the specific heat capacities of the corresponding elements of the section and also reaction times or other delay times.

For the determination of the estimated stationary exhaust gas temperature TEG_ENG_OUT_ST during emission from the combustion chamber, all these dynamic influences are ignored and thus the resulting exhaust gas temperature is estimated, assuming that stationary operating conditions prevail in the values for the current input variables.

A block B2 includes a further model that models the respective parts of the exhaust gas tract from the outlet from the emission chamber of the respective cylinder Z1 to Z8 to the input end of the catalytic converter 21 in terms of obtaining estimated exhaust gas temperatures at the input end of the catalytic converter 21. This model, too, can again be referred to as an observer of the corresponding section of the internal combustion engine.

The model of the block B2 can also be split up alternatively into a plurality of partial models, representing, for example, a first pipe piece of the exhaust gas tract leading from the outlet from the respective combustion chamber to the turbine, then the actual turbine 22 and finally a further pipe piece leading from the turbine to the catalytic converter 21.

Input variables of the block B2 are the estimated dynamic and stationary exhaust gas temperature TEG_ENG_OUT_DYN, TEG_ENG_OUT_ST during emission from the combustion chamber, the number of revs N, the mass air flow MAF, which may basically also include the exhaust gas ratio, the vehicle speed VS, an ambient temperature T_AMB and a turbine power POW_TUR for the turbine.

The vehicle speed VS can be dependent, for example, on the number of revs N, the transmission ratio of a gear of the vehicle in which the internal combustion engine is contained, and the wheel circumferences of the vehicle's wheels. It can also be determined in another way known to a person skilled in the art for these purposes.

The ambient temperature T_AMB can be recorded, for example, using an appropriate ambient temperature sensor or also using a corresponding physical model as a function of the intake air temperature. The turbine power POW_TUR can be determined, for example, using known performance characteristics as a function of the number of revs N and the mass air flow MAF.

In addition to these input variables of the block B2, it is also possible for further operating variables of the internal combustion engine to be input variables of the block B2 or it is also possible for only one subset of the aforementioned input variables to be input variables of the block B2. The model of the block B2 is designed to determine an estimated dynamic and stationary exhaust gas temperature TEG_CAT_IN_DYN, TEG_CAT_IN_ST at the input end of the catalytic converter 21. The determination of the estimated dynamic and/or stationary exhaust gas temperature TEG_ENG_OUT_DYN, TEG_ENG_OUT_ST at the input end of the catalytic converter 21 ensues in accordance with the procedure used to calculate the estimated dynamic and/or stationary exhaust gas temperature TEG_ENG_OUT_DYN, TEG_ENG_OUT_ST during emission from the combustion chamber in accordance with the model of the block B1. The model of the block B2 thus takes into consideration the thermal influence of the components of the exhaust gas tract located in the section from the outlet of the combustion chamber to the zone at the input end of the catalytic converter 21 on the exhaust gas flowing therein.

A block B4 includes a model, which can also be referred to as an observer, of the catalytic converter 21 in terms of its thermal properties and is designed to determine estimated dynamic and stationary component temperatures T_CAT_DYN, T_CAT_ST of the catalytic converter 21, as a function of the input variables of the block B4. The input variables of the block B4 are the estimated dynamic and stationary exhaust gas temperature TEG_CAT_IN_DYN, TEG_CAT_IN_ST at the input end of the catalytic converter, the number of revs N, the mass air flow MAF, the vehicle speed VS, the ambient temperature T_AMB and the reference air/fuel ratio LAM_SP, which, as the preferred manipulated variable in the context of protective measures to protect the catalytic converter 21, has a substantial influence on the temperature of the catalytic converter 21. Input variables may also be a subset of the aforementioned input variables of the block B4 or also additional operating variables of the internal combustion engine.

The determination of the estimated dynamic or stationary component temperature T_CAT_DYN, T_CAT_ST of the catalytic converter 21 is achieved in accordance with the relevant procedure in block B1 in terms of determining the estimated dynamic or stationary exhaust gas temperature TEG_ENG_OUT_DYN, TEG_ENG_OUT_ST during emission from the combustion chamber.

A block B6 is designed to determine an actual value T_CAT_AV of the component temperature of the catalytic converter 21, that is, as a function of the estimated dynamic and stationary component temperature T_CAT_DYN, T_CAT_ST of the catalytic converter 21. This may be preferably achieved taking into consideration a stationarity coefficient that is determined as a function of at least one operating variable of the internal combustion engine. The stationarity coefficient may be preferably a gradient of the estimated dynamic component temperature T_CAT_DYN and is thus representative of the degree of stationarity of the current driving operation of the internal combustion engine. The assignment thereof to the actual value T_CAT_AV for the component temperature of the catalytic converter 21 can be achieved, for example, using a performance characteristic dependent on the estimated dynamic and stationary component temperatures T_CAT_DYN, T_CAT_ST and the stationarity coefficient. Said assignment may be preferably achieved by means of corresponding experiments or simulations. Preferably, with increasing stationarity of the driving operation, the actual value T_CAT_AV for the component temperature may correlate more closely with the estimated dynamic component temperature T_CAT_DYN of the catalytic converter 21, whilst with increasing nonstationarity of the driving operation, it correlates more closely with the estimated stationary component temperature T_CAT_ST. In this way it has proved advantageous that optimum protective measures can be carried out in a uniform manner in the respective driving situations and that, when the internal combustion engine is virtually stationary, an unnecessarily extensive intervention with protective measures, in particular unnecessary thickening of the air/fuel mixture, can be avoided.

In a connection point V1, a regulating difference is formed from a maximum value T_CAT_MAX and the actual value T_CAT_AV for the component temperature of the catalytic converter 21 and is used as an input variable in a block B8, in which a corresponding controller is configured. The controller is used to implement protective measures for the component to be protected, that is, in the present example of the catalytic converter 21.

The controller for the block B8 is activated when the estimated dynamic component temperature T_CAT_DYN of the catalytic converter 21 exceeds a threshold value THD_CAT_PROT. The threshold value can be 920 degrees Celsius, for example. The maximum value T_CAT_MAX for the component temperature of the catalytic converter 21 can be 950 degrees Celsius, for example.

The controller can be preferably designed as an I-controller. In this way it is possible to set the maximum value T_CAT_MAX for the component temperature of the catalytic converter 21 quickly and in a vibration-free manner. The controller can also be configured, for example, as a P, PI, PID or other controller known to the person skilled in the art.

At the output end the controller generates a component protection adjustment signal SG_CAT_PROT, which can be, for example, a factor for influencing the reference air fuel ratio LAM_SP and thus, in order to avoid overheating of the catalytic converter 21, can lead to thickening of the air/fuel mixture.

Alternatively, in the block B6, it is also possible to assign to the actual value T_CAT_AV for the component temperature either the estimated dynamic or stationary component temperature T_CAT_DYN, T_CAT_ST or even, depending on the driving situation, a mean value derived from the estimated dynamic and stationary component temperature T_CAT_DYN, T_CAT_ST.

The stationarity coefficient can also be determined, for example, from a difference between the estimated dynamic and stationary component temperature T_CAT_DYN, T_CAT_ST.

The stationarity coefficient can also be determined, for example, from a gradient of the difference between the estimated dynamic and stationary component temperature T_CAT_DYN, T_CAT_ST. However, it can also be determined in a different way, such as, for example, as a function of a pedal value and/or a desired torque and/or a number of revs.

The invention claimed is:

1. A method for operating an internal combustion engine having at least one cylinder and an exhaust gas tract, which includes a component to be protected, the method comprising the steps of:
   determining an estimated dynamic component temperature of the component to be protected as a function of at least one operating variable of the internal combustion engine, taking into consideration the dynamic behavior of a section of the internal combustion engine,
   determining an estimated stationary component temperature of the component to be protected as a function of at least one operating variable of the internal combustion engine, without taking into consideration the dynamic behavior of the section of the internal combustion engine,
   determining an actual value for the component temperature of the component to be protected as a function of (a) the estimated dynamic component temperature, (b) the estimated stationary component temperature, and (c) one of (i) a gradient of the estimated dynamic component temperature or (ii) a gradient of a difference between the estimated dynamic component temperature and the stationary component temperature of the component to be protected, and implementing protective measures for the component to be protected as a function of the actual value for the component temperature of the component to be protected.

2. The method according to claim 1, wherein a stationarity coefficient is determined as a function of at least one operating variable of the internal combustion engine and, as a function of said stationarity coefficient, a method of assigning the estimated dynamic and stationary component temperature of the component to be protected to the actual value for the component temperature is influenced.

3. The method according to claim 2, wherein the stationarity coefficient is a difference between the estimated dynamic and stationary component temperature of the component to be protected.

4. A device for operating an internal combustion engine comprising at least one cylinder and an exhaust gas tract which contains a component to be protected, said device being operable to determine an estimated dynamic component temperature of the component to be protected as a function of at least one operating variable of the internal combustion engine, taking into consideration the dynamic behavior of a section of the internal combustion engine, to determine an estimated stationary component temperature of the component to be protected as a function of the at least one operating variable of the internal combustion engine, without taking into consideration the dynamic behavior of the section of the internal combustion engine, to determine an actual value for the component temperature of the component to be protected as a function of (a) the estimated dynamic component temperature, (b) the estimated stationary component temperature, and (c) one of (i) a gradient of the estimated dynamic component temperature or (ii) a gradient of a difference between the estimated dynamic component temperature and the stationary component temperature of the component to be protected, and to implement protective measures for the component to be protected as a function of the actual value for the component temperature of the component to be protected.

5. The device according to claim 4, the device being further operable to determine a stationarity coefficient as a function of at least one operating variable of the internal combustion engine and, as a function of said stationarity coefficient, to influence an assigning of the estimated dynamic and stationary component temperature of the component to be protected to the actual value for the component temperature.

6. The device according to claim 5, wherein the stationarity coefficient is a difference between the estimated dynamic and stationary component temperature of the component to be protected.

* * * * *